United States Patent
Song et al.

(10) Patent No.: US 9,083,268 B2
(45) Date of Patent: Jul. 14, 2015

(54) CONTROLLING CIRCUIT FOR FAN

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Yong-Jun Song, Wuhan (CN); Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 205 days.

(21) Appl. No.: 13/920,271

(22) Filed: Jun. 18, 2013

(65) Prior Publication Data

US 2014/0001996 A1 Jan. 2, 2014

(30) Foreign Application Priority Data

Jun. 29, 2012 (CN) .......................... 2012 1 02209826

(51) Int. Cl.
*G05B 5/00* (2006.01)
*H02P 6/00* (2006.01)

(52) U.S. Cl.
CPC ...................................... *H02P 6/002* (2013.01)

(58) Field of Classification Search
CPC .............. H01M 10/443; H01M 10/486; H02J 2007/0037; G01K 3/005; H05K 7/20209
USPC ........................................................ 318/471
See application file for complete search history.

(56) References Cited

U.S. PATENT DOCUMENTS 4,420,446 A * 12/1983 Wieder et al. ................. 264/40.6

* cited by examiner

*Primary Examiner* — Karen Masih
(74) *Attorney, Agent, or Firm* — Novak Druce Connolly Bove + Quigg LLP

(57) ABSTRACT

A controlling circuit for a fan includes three comparators, a capacitor, and a thermistor. When the temperature around the thermistor changes, the resistance of the thermistor changes. The comparators control the charging and discharging time of the capacitor, thereby generating a corresponding pulse width modulation signal to the fan according to the temperature, to adjust the speed of the fan.

4 Claims, 1 Drawing Sheet

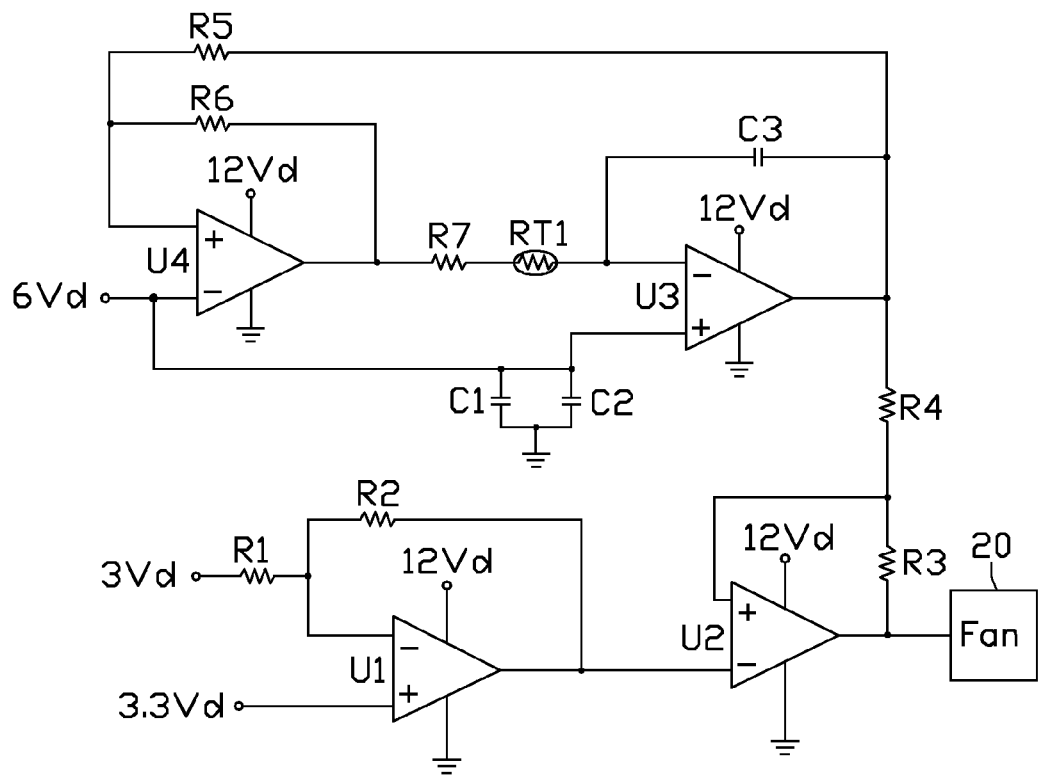

CONTROLLING CIRCUIT FOR FAN

BACKGROUND

1. Technical Field

The present disclosure relates to a controlling circuit for a fan.

2. Description of Related Art

Electronic elements, such as central processing units, generate a lot of heat when operating; hence, a fan may be used to dissipate the heat. A control chip, such as a south bridge chip, together with a temperature sensor, may be used to control the speed of a fan to regulate the temperature of an electronic element. However, if the control chip malfunctions, the speed of the fan may not be able to dissipate the heat adequately, which may result in damage to the electronic elements. Also, the fan may continuously run at maximum speed and thereby wasting energy.

Therefore, there is room for improvement in the art.

BRIEF DESCRIPTION OF THE DRAWING

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

The FIGURE is a circuit diagram of an embodiment of a controlling circuit for a fan of the present disclosure.

DETAILED DESCRIPTION

The FIGURE illustrates an embodiment of a controlling circuit for a fan 20 arranged in a computer. The controlling circuit includes an amplifier U1, three comparators U2-U4, seven resistors R1-R7, three capacitors C1-C3, and a thermistor RT1. In the embodiment, the thermistor RT1 is a positive temperature coefficient thermistor. Resistance of the thermistor RT1 will increase when the temperature of the surrounding area where the thermistor RT1 is deposited increases. Alternatively, the resistance of the thermistor RT1 will decrease when the temperature decreases.

An inverting input terminal of the comparator U4 is coupled to a power terminal 6 Vd, and also coupled to a non-inverting input terminal of the comparator U3. A power terminal of the comparator U4 is coupled to a power source 12 Vd, and a ground terminal of the comparator U4 is connected to ground. An output terminal of the comparator U4 is coupled to a non-inverting input terminal of the comparator U4 through the resistor R6, and is also coupled to an inverting input terminal of the comparator U3 through the resistor R7 and the thermistor RT1 in that order. A non-inverting input terminal of the comparator U3 is connected to ground through the capacitors C1 and C2 connected in parallel. A ground terminal of the comparator U3 is connected to ground. A power terminal of the comparator U3 is connected to the power source 12 Vd. An output terminal of the comparator U3 is coupled to the inverting input terminal of the comparator U3 through the capacitor C3 and is coupled to the non-inverting input terminal of the comparator U4 through the resistor R5. The output terminal of the comparator U3 is also coupled to an output terminal of the comparator U2 through the resistors R4 and R3 in that order.

An inverting input terminal of the amplifier U1 is coupled to a power source 3 Vd through the resistor R1. A non-inverting input terminal of the amplifier U1 is coupled to a power source 3.3 Vd. A ground terminal of the amplifier U1 is connected to ground, and a power terminal of the amplifier U1 is coupled to the power source 12 Vd. An output terminal of the amplifier U1 is coupled to an inverting input terminal of the comparator U2, and is also coupled to the inverting input terminal of the amplifier U1 through the resistor R2. The output terminal of the amplifier U1 is configured to output an amplified voltage to the inverting input terminal of the comparator U2. A power terminal of the comparator U2 is coupled to the power source 12 Vd, and a ground terminal of the comparator U2 is connected to ground. The output terminal of the comparator U2 is connected to the fan 20 in order to output a pulse width modulation (PWM) signal to the fan 20, thereby controlling the speed of the fan 20. The non-inverting input terminal of the comparator U2 is connected to a node between the resistors R4 and R3.

When the computer is turned on, the power sources 6 Vd and 12 Vd provide power, the output terminal of the comparator U4 and the inverting input terminal of the comparator U3 have no voltage, and the voltage of the non-inverting input terminal of the comparator U3 is greater than that of the inverting input terminal of the comparator U3. Hence, the output terminal of the comparator U3 outputs a high voltage, thereby charging the capacitor C3, where the charging time T1 of the capacitor C3 is (R7+RT1)*C3, C3 stands for the capacitance of the capacitor C3, R7 stands for the resistance of the resistor R7, and RT1 stands for the resistance of the thermistor RT1. At the same time, the voltages of the non-inverting input terminals of the comparators U2 and U4 are increased when the capacitor C3 is charged. When the voltage of the non-inverting input terminal of the comparator U4 is greater than the voltage of the inverting input terminal of the comparator U4, the comparator U4 outputs a high voltage to the inverting input terminal of the comparator U3. The output terminal of the comparator U3 will output a low voltage when the voltage of the inverting input terminal of the comparator U3 is greater than that of the non-inverting input terminal of the comparator U3. Accordingly, as the voltage of the output terminal of the comparator U3 changes from high level to low level, the capacitor C3 discharges, and the discharging time T2 of the capacitor C3 is R4*C3, where R4 stands for the resistance of the resistor R4 and C3 stands for the capacitance of the capacitor C3. The voltages of the non-inverting input terminal of the comparators U2 and U4 decrease gradually. On the condition that the voltage of the non-inverting input terminal of the comparator U4 is less than the voltage of the inverting input terminal of the comparator U4, the output terminal of the comparator U4 will output no voltage, and the output terminal of the comparator U3 outputs a high voltage to charge the capacitor C3.

When the voltage of the non-inverting input terminal of the comparator U2 is greater than the voltage of the inverting input terminal of the amplifier U1, the comparator U2 outputs a high pulse width modulation (PWM) signal. Otherwise, the output terminal of the comparator U2 outputs a low PWM signal. Accordingly, the PWM signal with a duty cycle of T1/(T1+T2) is transmitted to the fan 20 through the output terminal of the comparator U2.

On the condition that the temperature increases, the resistance of the thermistor RT1 is increased, the charging time T1 of the capacitor C3 is increased, and the value of the duty cycle of T1/(T1+T2) is increased. Hence a duty cycle of the PWM signal is also increased, and the fan 20 will speed up to dissipate more heat. Otherwise, when the temperature decreases, the resistance of the thermistor RT1 decreases, the charging time T1 of the capacitor C3 decreases, and the value of the duty cycle of T1/(T1+T2) decreases. Accordingly, the duty cycle of the PWM signal also decreases, and the fan 20 will slow down, to save energy.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A controlling circuit for a fan, comprising:
   first to third comparators each comprising an inverting input terminal, a non-inverting input terminal, an output terminal, a power terminal coupled to a first power source, and a ground terminal connected to ground; and
   a thermistor;
   wherein the inverting input terminal of the first comparator is coupled to a second power source, the output terminal of the first comparator is connected to the non-inverting input terminal of the first comparator through a first resistor, and is also coupled to the inverting input terminal of the second comparator through a second resistor and the thermistor in that order; the non-inverting input terminal of the second comparator is coupled to the second power source, and the output terminal of the second comparator is connected to the inverting input terminal of the second comparator through a first capacitor, the output terminal of the second comparator is coupled to the non-inverting input terminal of the first comparator through a third resistor, the output terminal of the second comparator is coupled to the output terminal of the third comparator through fourth and fifth resistors in that order; the inverting input terminal of the third comparator is coupled to a third power source, the non-inverting input terminal of the third comparator is coupled to a node between the fourth and fifth resistors, the output terminal of the third comparator is coupled to the fan.

2. The controlling circuit of claim 1, wherein the non-inverting input terminal of the second comparator is connected to ground through a second capacitor.

3. The controlling circuit of claim 2, wherein the non-inverting input terminal of the second comparator is further connected to ground through a third capacitor.

4. The controlling circuit of claim 3, further comprising an amplifier, wherein an inverting input terminal of the amplifier is coupled to a fourth power source through a sixth resistor, a non-inverting input terminal of the amplifier is coupled to a fifth power source, a power terminal of the amplifier is coupled to the first power source, a ground terminal of the amplifier is connected to ground, and an output terminal of the amplifier is coupled to the inverting input terminal of the amplifier through a seventh resistor, the output terminal of the amplifier is coupled to the inverting input terminal of the third comparator, to output the third power source.

* * * * *